(12) United States Patent
Kissel, Jr.

(10) Patent No.: US 8,011,204 B2
(45) Date of Patent: Sep. 6, 2011

(54) KENNEL BED CHILLERS

(75) Inventor: Waldemar F. Kissel, Jr., Gainesville, FL (US)

(73) Assignee: WFK & Associates, LLC, Gainesville, FL (US)

( * ) Notice: Subject to any disclaimer, the term of this patent is extended or adjusted under 35 U.S.C. 154(b) by 395 days.

(21) Appl. No.: 12/043,572

(22) Filed: Mar. 6, 2008

(65) Prior Publication Data

US 2008/0216496 A1 Sep. 11, 2008

Related U.S. Application Data

(60) Provisional application No. 60/905,332, filed on Mar. 6, 2007.

(51) Int. Cl.
*F25D 17/02* (2006.01)
(52) U.S. Cl. ........................................................ 62/434
(58) Field of Classification Search .................. 62/434, 62/371, 259.1, 132
See application file for complete search history.

(56) References Cited

U.S. PATENT DOCUMENTS

| | | | |
|---|---|---|---|
| 2,617,005 A | 11/1952 | Jorgensen | |
| 2,842,651 A | 7/1958 | Neely | |
| 4,064,835 A | 12/1977 | Rabenbauer | |
| 4,169,428 A * | 10/1979 | Waugh | 119/482 |
| 4,201,153 A | 5/1980 | Nace | |
| 4,332,214 A | 6/1982 | Cunningham | |
| 4,591,694 A | 5/1986 | Phillips | |
| 4,899,693 A | 2/1990 | Arnold | |
| 5,371,340 A | 12/1994 | Stanfield | |
| 6,237,531 B1 | 5/2001 | Peoples et al. | |
| 6,553,935 B1 | 4/2003 | Penner | |
| 6,647,924 B1 | 11/2003 | Zwicker et al. | |
| 7,530,326 B2 * | 5/2009 | Dunn et al. | 119/28.5 |

* cited by examiner

*Primary Examiner* — Melvin Jones
(74) *Attorney, Agent, or Firm* — Michael J. Colitz, III; Gray Robinson, P.A.

(57) ABSTRACT

Disclosed is a system for controlling the temperature of a series of interconnected kennels. The system includes a primary reservoir and supply and return lines for delivering a refrigerant to the series of kennel beds. Each of the kennels includes a flexible bed for supporting the animal and an interior chamber which is adapted to receive a volume of the refrigerant. Thus, the refrigerant, by way of the supply and return valves, is continuously supplied to the beds to provide a pleasing temperature for the animal.

7 Claims, 2 Drawing Sheets

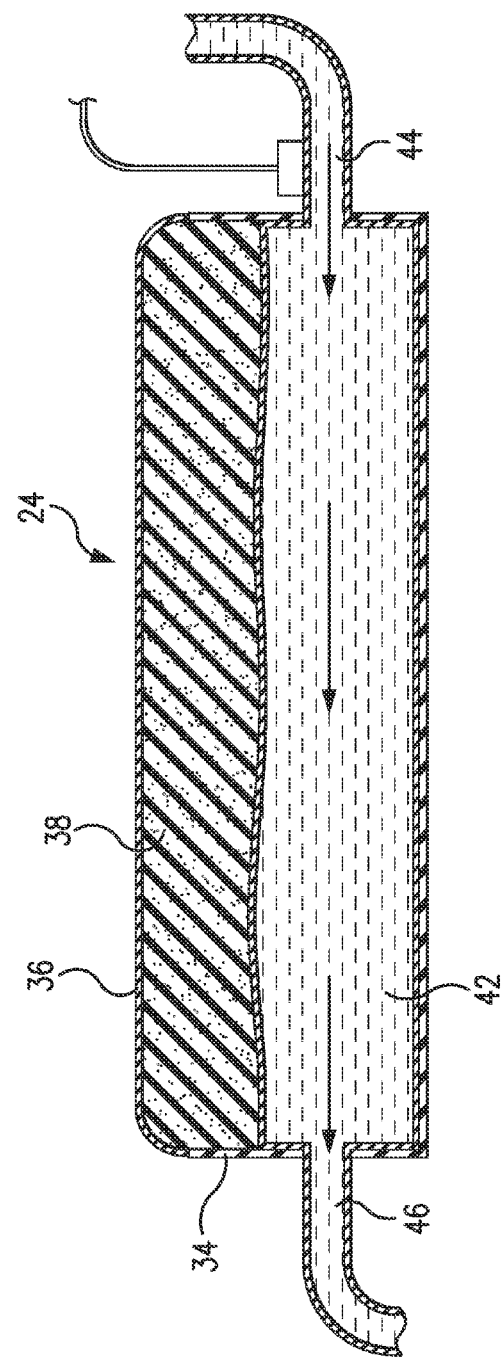

KENNEL BED CHILLERS

CROSS-REFERENCE TO RELATED APPLICATIONS

This application claims priority to co-pending provisional patent application entitled "Kennel Bed Chillers" filed on Mar. 6, 2007 under application Ser. No. 60/905,332. The contents of this co-pending application are incorporated herein by reference.

BACKGROUND OF THE INVENTION

1. Field of the Invention

The present invention relates to an animal bed and, more particularly, to an animal bed that is chilled by a refrigerant.

2. Description of the Background Art

The background art contains examples of cooled pet beds. For example, U.S. Pat. No. 6,647,924 to Zwicker et al. discloses an animal shelter with a circumferential support element and a support skeleton, both of which can be filled with a cooling gel material.

U.S. Pat. No. 4,899,693 to Arnold discloses a cooled pet bed. The bed includes a recess that is dimensioned to receive a container of ice.

Furthermore, U.S. Pat. No. 4,332,214 to Cunningham discloses a heated bed for animals. The bed includes inner and outer shells that define an interior volume suitable for containing a liquid having a high thermal capacity such as water. Thermostatic controls are provided for controlling an electric heater that can selectively heat the water within the bed.

Although each of these inventions achieves its own individual objective, none of the background art provides a system for regulating the temperature of a series of kennel beds by way of a refrigerant. The present invention is aimed at fulfilling this need.

SUMMARY OF THE INVENTION

It is therefore one of the objects of this invention to provide a number of different kennel beds that are interconnected by a fluidic circuit.

It is another object of this invention to provide a means for controlling the temperature of a series of kennel beds.

Finally, it is a further object of this invention to regulate the volume of refrigerant being supplied to a series of kennel beds.

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be made to the following detailed description taken in connection with the accompanying drawings in which:

FIG. 2 is a cross section of a kennel employed in the system of the present invention.

Similar reference characters refer to similar parts throughout the several views of the drawings.

DETAILED DESCRIPTION OF THE PREFERRED EMBODIMENT

Figure 1:
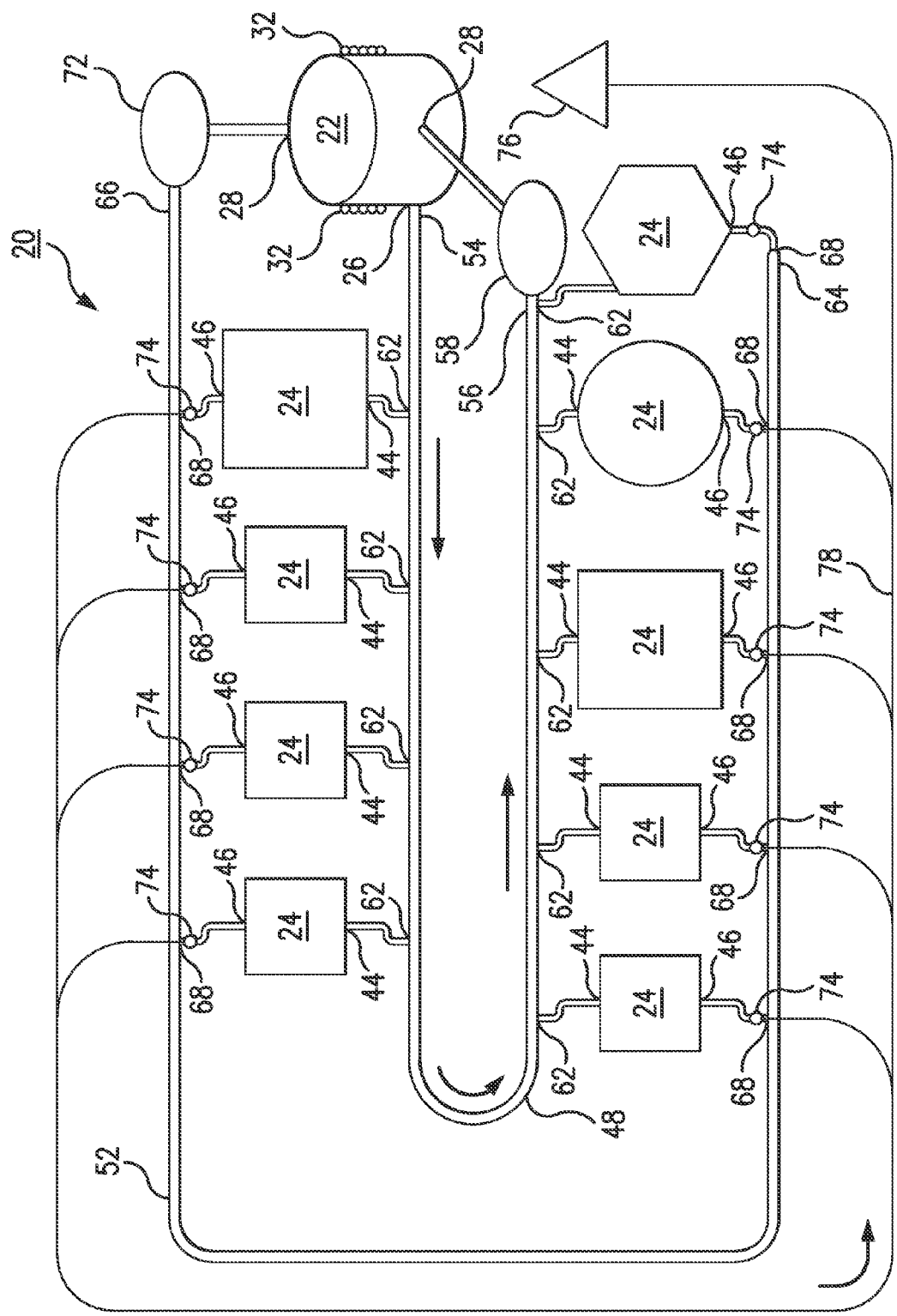
FIG. 1 is a schematic view of the system of the present invention.

The present invention relates to a system for controlling the temperature of a series of interconnected kennels. The system includes a primary reservoir and supply and return lines for delivering a refrigerant to the series of kennel beds. Each of the kennels includes a flexible bed for supporting the animal and an interior chamber that is adapted to receive a volume of the refrigerant. Thus, the refrigerant, by way of the supply and return valves, is continuously supplied to the beds to provide a pleasing temperature for the animal. The various components of the present invention, and the manner in which they relate, will be described in greater detail hereinafter.

With reference as to FIG. 1, a schematic representation of the inventive system 20 is depicted. A large reservoir 22 is included and is filled with a suitable volume of refrigerant. The volume of refrigerant needed for system 20 will depend on the number of kennels 24 as well as their shape and size. In the preferred embodiment, reservoir 22 is filled with a refrigerant that is a combination of water and a commercially available anti-freeze. Although a water/anti-freeze mixture is preferred, those skilled in the thermodynamic arts will appreciate that other refrigerants can also be employed. The beneficial characteristic of the refrigerant is that it can maintain its temperature for prolonged periods of time. With continuing reference to FIG. 1, reservoir 22 includes an outlet 26 and two inlets 28 for use in continuously circulating the refrigerant to the different kennel beds 24.

The temperature of the refrigerant within the reservoir is regulated by refrigerator coils 32. Namely, a series of refrigerator coils 32 are thermodynamically coupled to the outside of reservoir 22. However, those skilled in the art will appreciate that refrigerator coils 32 can just as easily be included on the interior of reservoir 22. Coils 32 are coupled to a condenser and a compressor (not shown) to form a refrigeration cycle. In this regard, coils 32 include a separate supply of a refrigerant. This refrigerant cycle is used to selectively control the temperature of the refrigerant within reservoir 22 and, thereby, the temperature of the animal beds.

With continuing reference to FIG. 1, the series of kennels 24 are described. Kennels 24 are preferably formed in various shapes and sizes to accommodate different sized pets. Kennels 24 with varying geometric shapes are likewise provided, such as circular, square, or hexagonal. By varying the shapes and sizes of the different kennels 24, different cooling effects can be achieved. As noted, in FIG. 2, each kennel 24 includes an outer rigid frame 34 for supporting kennel 24 on the ground as well as an interior bed 36 for supporting the animal. In the preferred embodiment, each bed 36 includes a soft, flexible and cushioned upper surface 38 that is suitable for comfortably supporting the animal. Each bed also includes an interior chamber 42 that is adapted to receive the refrigerant. In this regard, the bed should be made of a material that permits the transfer of heat from the refrigerant to the outer surface 38 of bed 36. The interior chamber 42 of bed 36 is also preferably water resistant so as to prevent the animal from coming into contact with the refrigerant. As illustrated, each chamber includes an inlet 44 and an outlet 46 for the passage of the refrigerant.

The supply and return lines (48 and 52) are described next in conjunction with FIG. 1. Namely, the refrigerant is delivered from reservoir 22 to the individual kennels 24 by way of supply line 48, such as a conventional PVC pipe. The refrigerant is thereafter returned back to reservoir 22 by way of return line 52, which again can take the form of a conventional PVC pipe. The diameter of the pipe used will depend in large measure on the number and size of kennels 24 included in the system 20. The size of the kennels 24, in turn, depends upon the types of animals being housed.

Whatever size of pipe is used, supply pipe 48 has a first end 54 coupled to the outlet 26 of reservoir 22 and a second end 56 that is interconnected to one of the reservoir inlets 28. A threaded interconnection can be used between the supply pipe 48 and reservoir 22 to form a water tight connection. A pump 58 is preferably interconnected between the second end 56 of supply pipe 48 and inlet 28 of reservoir 22 and is used to pump the refrigerant back into reservoir 22. Supply pipe 48 additionally includes a number of ports 62 that are spaced along its intermediate length, with the number of ports 62 corresponding to the number of pet kennels 24 in the system 20. In the depicted embodiment, nine kennels 24 are employed and, therefore, nine ports 62 are included along the length of supply pipe 48. Each of the ports 62 is coupled to the inlet 44 of an associated kennel chamber 42. In this regard, ports 62 may include a threaded extent that is interconnected to mating threads on the inlet 44 of the chamber 42 so as to form a fluid tight connection. Thus, the refrigerant returned to reservoir 22 via second end 56 is only that volume of refrigerant that is not otherwise delivered to the various kennel chambers 42.

The return pipe 56 is described next in conjunction with FIG. 1. Return pipe 56 is defined by a first end 64, a second end 66, and an intermediate extent therebetween. The first end 64 of return pipe 52 is coupled to a kennel 24. The intermediate extent of the return pipe 56 includes a series of spaced return ports 68. Again, the number of return ports 68 corresponds to the number of kennels 24 employed in system 20. As with the supply ports 62, the return ports 68 include a threaded extent that is secured within the threaded outlet 46 of an associated kennel chamber 42. Thus, the refrigerant supplied to return pipe 52 is that volume passing through the associated kennel chambers 42. The second end 66 of the return pipe 52 is likewise interconnected to one of the inlets 28 in reservoir 22 in a fluid tight manner. An additional pump 72 is coupled between the second end 66 of return pipe 52 and inlet 28 of reservoir 22 and functions in pumping refrigerant back into reservoir 22.

As described, a fluid circuit is thereby created for the refrigerant. In the circuit, the refrigerant is delivered from reservoir 22 by way of supply pipe 48 and flows into each of the chambers 42 in system 20. This flow can be promoted by way of pump 58 "pulling" the refrigerant through the system. Once in a chamber 42, the refrigerant then functions in cooling the associated bed 36 to thereby create a more pleasing environment for the animal. Namely, heat from the surface 38 of bed 36 is absorbed by the refrigerant, thereby cooling bed 36 for the animal. Conversely, those skilled in the thermodynamic arts will appreciate that the invention can also be used to provide heat. The heated refrigerant is permitted to exit chamber 42 by way of return pipe 52 and is then delivered back into reservoir 22 via pump 72. The refrigerant can be brought back to a suitable temperature by way of refrigerator coils 32. This circuit is used for all the beds 36 coupled to system 20.

The control circuit for the present invention is described next. The control circuit includes a series of control valves 74, each of which is associated with a corresponding kennel 22. Control valves 74 are positioned between an associated return port 68 and the outlet 46 of an associated chamber 42. Each control valve 72 can be independently opened and closed to varying degrees to selectively regulate the volume of refrigerant leaving the associated chamber 42. A controller 76, which can be a micro computer, is electrically coupled with each of the associated control valves 74 via data line 78. Thus, each control valve 74 can be independently operated from controller 76 to regulate the volume of refrigerant within a particular bed 36. Controller 76 can likewise be used to regulate the temperature of the refrigerant. Thus, a user can both control the temperature of the refrigerant and the volume of refrigerant leaving an individual chamber 42. This allows the temperature of the associated kennel bed 24 to be adequately and independently regulated.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted without departing from the spirit and scope of the invention.

What is claimed is:

1. A system for controlling the temperature of a series of interconnected kennels, the system comprising:
   a reservoir filled with a refrigerant, the refrigerant being a combination of water and antifreeze, the reservoir having an outlet and two inlets, a series of refrigerator coils thermodynamically coupled to the reservoir and serving to control the temperature of the refrigerant;
   a series of pet kennels associated with the reservoir, the pet kennels being formed into various geometric shapes, each kennel including a bed supported by a rigid outer frame, each bed including a soft, flexible upper surface and a water resistant interior chamber, each interior chamber including an inlet and an outlet;
   a supply pipe with a first end and a second end and an intermediate extent therebetween, the first end of the supply pipe coupled to the outlet of the reservoir, the second end of the supply pipe coupled to one of the inlets of the reservoir, a pump operatively coupled between the second end of the supply pipe and the inlet of the reservoir and functioning to pump refrigerant back into the reservoir, a series of supply ports formed along the intermediate extent of the supply pipe, the number of supply ports corresponding to the number of pet kennels, each supply porting being coupled to the inlet of an associated chamber;
   a return pipe with a first end and a second end and an intermediate extent therebetween, a series of return ports formed along the intermediate extent of the return pipe, the number of return ports corresponding to the number of pet kennels, each return port being coupled to the outlet of an associated chamber, the second end of the return pipe being coupled to one of the inlets of the reservoir, a pump operatively coupled between the second end of the return pipe and the inlet of the reservoir and functioning to pump refrigerant back into the reservoir;
   a series of control valves, the number of control valves corresponding to the number of kennel beds, each control valve being operatively positioned between an associated return port and the outlet of an associated chamber; each control valve functioning to selectively control the volume of refrigerant leaving the associated chamber;

a controller in electrical communication with each of the control valves and the refrigerator coils, whereby the controller can selectively increase or decrease the volume of fluid leaving the series of chambers as well as the temperature of the refrigerator coils to thereby effectively control the temperature of the beds.

2. A system for controlling the temperature of a series of interconnected kennels, the system comprising:

a reservoir filled with a volume of refrigerant, the refrigerant having a temperature;

a series of pet kennels associated with the reservoir, each kennel having a bed with chamber;

a fluid delivery circuit interconnecting the reservoir with the chamber of each kennel in the series;

at least one control valve for regulating the volume of refrigerant delivered to each of the chambers.

3. The system as described in claim 2 wherein a control valve is associated with each of the chambers.

4. The system as described in claim 3 further comprising a controller in electrical communication with each of the control valves whereby the controller can selectively increase or decrease the volume of fluid leaving the series of chambers.

5. The system as described in claim 2 wherein a coil is thermodynamically coupled to the reservoir and is used in regulating the temperature of the refrigerant.

6. The system as described in claim 2 wherein kennels of differing shapes and sizes are provided so as to create differing thermodynamic effects.

7. A system for cooling a number of interconnected kennel beds comprising:

a reservoir filled with a refrigerant, the reservoir having an inlet and an outlet;

a number of pet beds, which each bed having an internal fluid chamber with an inlet and an outlet, the pet beds having varying shapes and sizes;

a fluid delivery circuit for circulating refrigerant from the outlet of the reservoir, through the inlet and the outlet of each fluid chamber and back to the inlet of the reservoir;

wherein the various shapes and sizes of the pet beds provides for varying cooling effects.

* * * * *